(No Model.)
J. WHEELOCK.
METALLIC RING PACKING.
No. 452,900. Patented May 26, 1891.
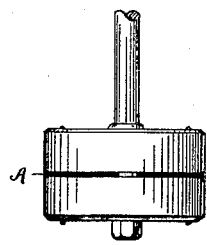
Fig. 1.
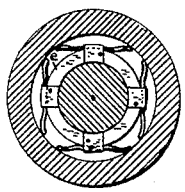
Fig. 2.
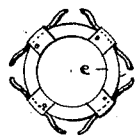
Fig. 3.
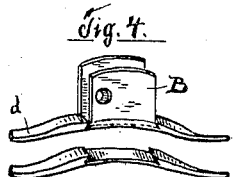
Fig. 4.
Fig. 5.
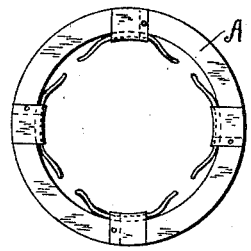
Fig. 6.
Fig. 8.
Fig. 9.
Fig. 7.
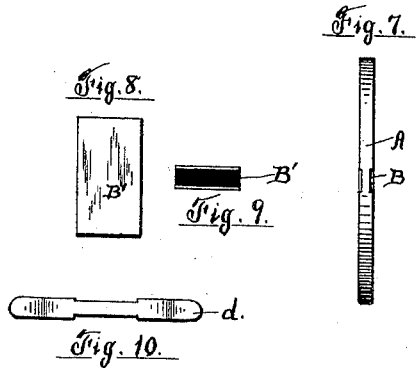
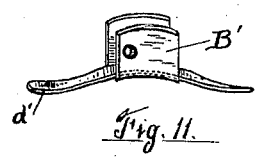
Fig. 11.
Fig. 10.
Witnesses
Frank A. Cutter.
F. L. Robinson.
Inventor
Jerome Wheelock
THE NORRIS PETERS CO., PHOTO-LITHO., WASHINGTON, D. C.

UNITED STATES PATENT OFFICE.

JEROME WHEELOCK, OF WORCESTER, MASSACHUSETTS.

METALLIC RING-PACKING.

SPECIFICATION forming part of Letters Patent No. 452,900, dated May 26, 1891.

Application filed November 29, 1890. Serial No. 373,096. (No model.)

*To all whom it may concern:*

Be it known that I, JEROME WHEELOCK, of the city and county of Worcester, in the State of Massachusetts, have invented certain new and useful Improvements in Metallic Ring-Packing; and I do hereby declare that the following specification, taken in connection with the drawings furnished and forming a part of the same, is a clear, true, and complete description of my invention.

My said improvements relate to that class of packing, whether for pistons or for rods, which involves the use of metal rings, which are either expansive or contractile, as the case may be, and are backed up by springs, so as to force them against coincident surfaces for maintaining a good packing-contact. Such rings are sometimes cut radially into two or more sections, and are sometimes cut only partially through in radial lines at several point, and wholly through at some one point. Instances of such rings will be found in my Letters Patent No. 297,891, dated April 29, 1884, wherein are shown rings somewhat of the nature herein described.

The object of my present invention is to economically produce a sectional break-joint packing-ring of minimum bearing-surface, and so arranged that the springs may be attached and removed from the break-joint lugs.

To particularly describe my invention, I will refer to the accompanying drawings, in which—

Figure 1 is a view of a piston provided with a single ring-packing. Fig. 2 is a vertical cross-section of a piston-rod gland containing rod-packing and springs in accordance with my invention. Fig. 3 is a side view of a sectional ring provided with my improved springs. Figs. 4 and 5 are perspective views of my improved spring attached and detached to the break-joint lugs. Fig. 6 is a side view of a packing-ring provided with lug and springs, in accordance with my invention. Fig. 7 is an edge view of the ring. Fig. 8 is a blank from which the break-joint lug is formed. Fig. 9 shows an edge view of the break-joint lug when formed. Fig. 10 shows another form of spring, and Fig. 11 shows perspective view of this spring attached to the break-joint lug.

In my prior invention referred to herein the break-joint lug and the spring are formed from one and the same piece of metal, necessitating considerable waste of the metal sheet from which the blank is cut, also causing inconvenience in the process of manufacture, and in the event of an accident from any cause the spring becomes broken from the lug the whole must be replaced, although the lug may be practically in good condition. To obviate these and other difficulties I have produced my present invention.

By referring to blank B, Fig. 8, it will be seen to be a simple blank sheet of required thickness to be of use only as a break-joint lug. When formed into the shape as shown in Fig. 9, it need not be of same thickness or metal as the springs, but may be constructed separately and complete.

The spring $d'$, Fig. 10, is made with slight recesses on its side that exactly correspond with the length of the lug $D'$, Fig. 9, and the lug is forced onto the spring, which, when in place, as shown in Fig. 11, forms a flush surface with the sides of the break-joint lug and a continuous surface for the sectional ring-packing joint to slide upon and successfully break the joint at the bottom or inner surface of the ring.

Figs. 4 and 5 show another form of spring by which a narrow ring may be used, and the spring may be applied to outer base of the break-joint lug. By this method of construction I make the sides of the spring continuous and of the same width of the base of lug; but I indent the top of spring at the point of intersection of lug until its top surface outside is flush with the surface of the ring fitted in break-joint lug, so as to form a steam-tight joint when packing segments separate. It will be readily seen that a spring may thus be attached without materially interfering with its strength, and a lug may be made of any suitable metal of very much less thickness for the wall of the lug, and the sectional ring may be entirely finished and the springs applied or detached at will for repair or renewal, it being advisable to make the springs of uniform dimensions.

In piston-rod packing it is obvious that springs of substantially the same character are employed; but, as shown in Fig. 2, they are reversed in position, the same being applied to the outside of lug instead of inside, as before described.

It will of course be understood that my invention pertains in no manner to any particular variety of piston or piston-rod gland, it being obvious that if they are adapted to the use of metallic packing-rings they may be profitably employed therewith.

Having thus described my invention, what I claim as new, and desire to secure by Letters Patent, is—

The combination, with an expansible or contractile packing-ring, of one or more angular break-joint lugs shaped to fit the recessed ends of the packing-ring and provided with attachable and detachable springs, the edges of the springs being flush with said lugs and breaking joint at the base of the slip of the packing-ring, substantially as shown and described.

JEROME WHEELOCK.

Witnesses:
   H. L. WHEELOCK,
   B. E. ARNOLD.